Figure 1:
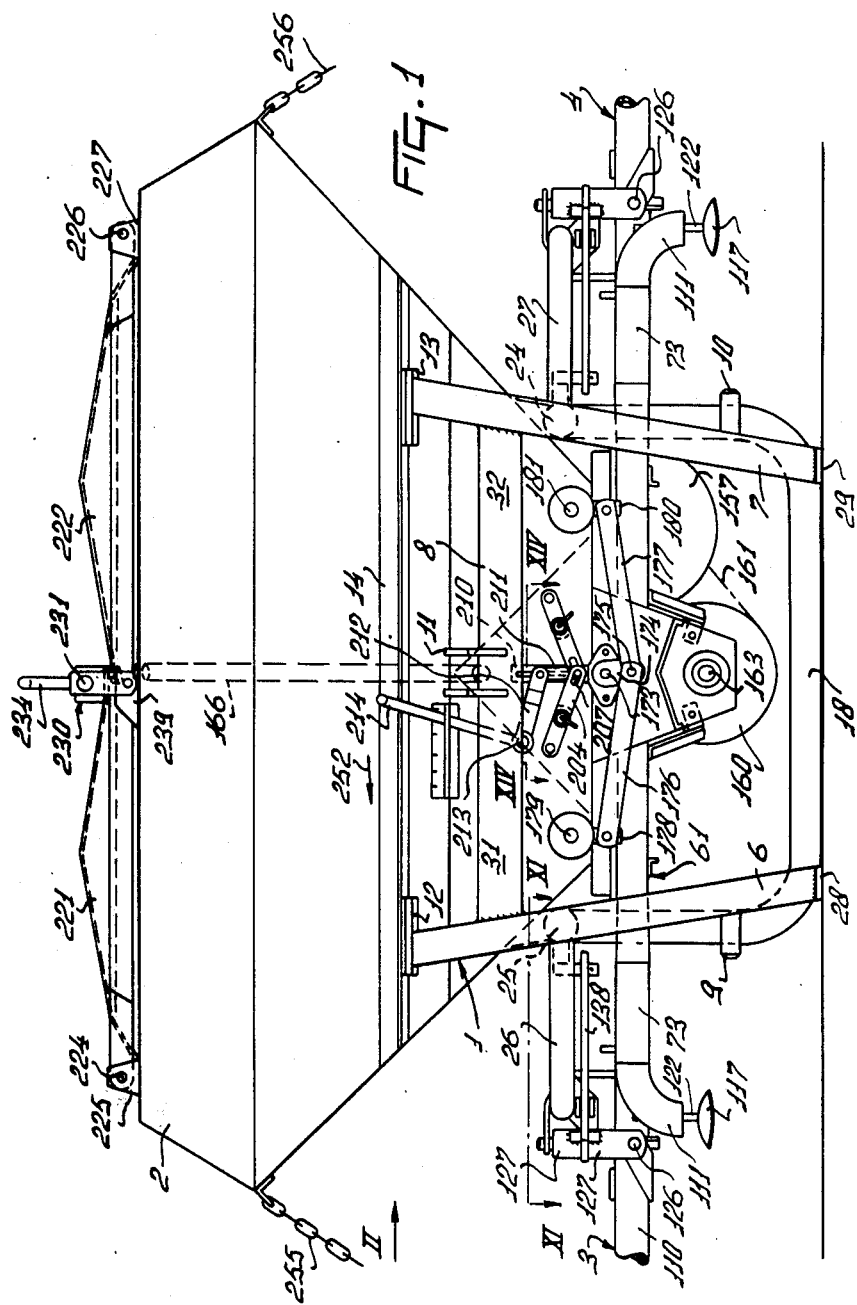

United States Patent [19]

van der Lely et al.

[11] 4,008,854
[45] Feb. 22, 1977

[54] SPREADING IMPLEMENTS

[76] Inventors: Ary van der Lely, 10, Weverskade, Maasland; Cornelis Johannes Gerardus Bom, 36, Esdoornlaan, Rozenburg, both of Netherlands

[22] Filed: Jan. 13, 1975

[21] Appl. No.: 540,327

[30] Foreign Application Priority Data

Jan. 18, 1974 Netherlands .................... 7400683

[52] U.S. Cl. ................................................ 239/655
[51] Int. Cl.$^2$ .......................................... A01C 3/06
[58] Field of Search ........................ 239/654, 655; 214/83.28

[56] References Cited

UNITED STATES PATENTS

| | | | |
|---|---|---|---|
| 2,388,798 | 11/1945 | Parker | 239/655 |
| 3,099,497 | 7/1963 | Albert | 214/83.28 |
| 3,568,937 | 3/1971 | Grataloup | 239/655 |
| 3,730,395 | 5/1973 | Gallogly et al. | 239/655 |

FOREIGN PATENTS OR APPLICATIONS 567,058 12/1958 Canada ................................ 239/655

*Primary Examiner*—Philip Goodman
*Assistant Examiner*—Richard A. Bertsch
*Attorney, Agent, or Firm*—Mason, Mason & Albright

[57] ABSTRACT

A spreading implement has at least one hopper, preferably with two outlet spouts at the bottom thereof. Each spout has an outlet port through which material passes and a flow control device having holes is positioned beneath each port. A group of distributor pipes is mounted below a corresponding control device at each side of the hopper and the pipes extend laterally from the implement to terminate with outlets at different distances from the hopper. The inner ends of each group of pipes adjoin an inlet nozzle formed by open pipe channels and connectors that correspond to each pipe. The channels receive material from corresponding holes in the control device and the latter can be moved via a setting device to more or less register with apertures formed in a cover plate that overlies said channels. An enclosed air chamber is formed between the spouts at the bottom of the hopper and a blower forces air through the chamber into each inlet nozzle that enters the sides of the chamber. Each nozzle together with a group of pipes is pivotable about a horizontal pivot together with a side of the air chamber to a lower position which exposes the device for cleaning. The pipes are also pivotable about an upwardly extending axis to disconnect their inner ends from their connections to the nozzle and allow the pipes to swing as a unit rearwardly if an obstacle is encountered with sufficient force to unlock a spring biased mechanism. The pipes can also be pivoted with their supports upwardly for transport. The hopper is hermetically sealed and a rotatable agitator is provided adjacent each spout to facilitate material feed to each port. The agitators and blower are turned by a p.t.o. connection at the front of the hopper. A setting mechanism that moves each flow control device separately or in common can also be connected to a throttling vane to simultaneously adjust the amount of air being forced to the pipes.

87 Claims, 19 Drawing Figures

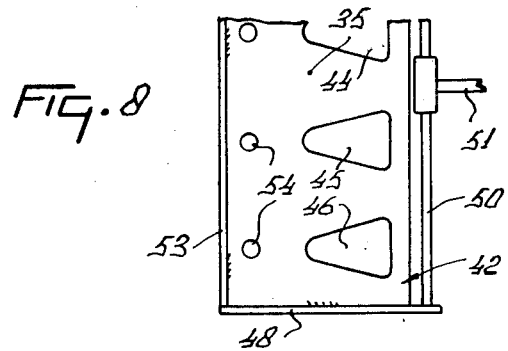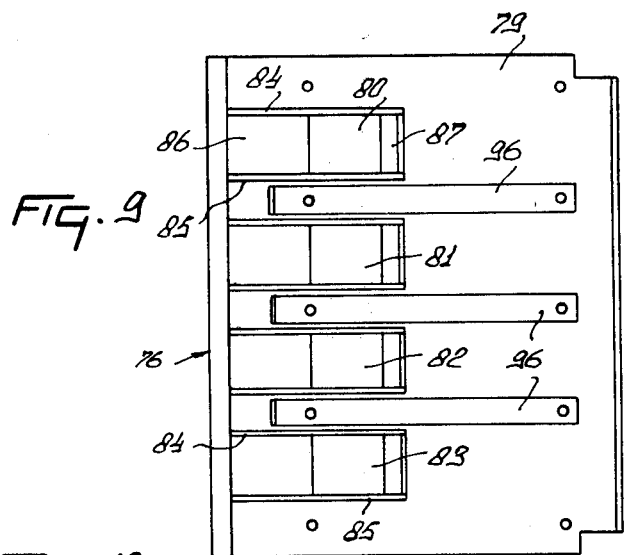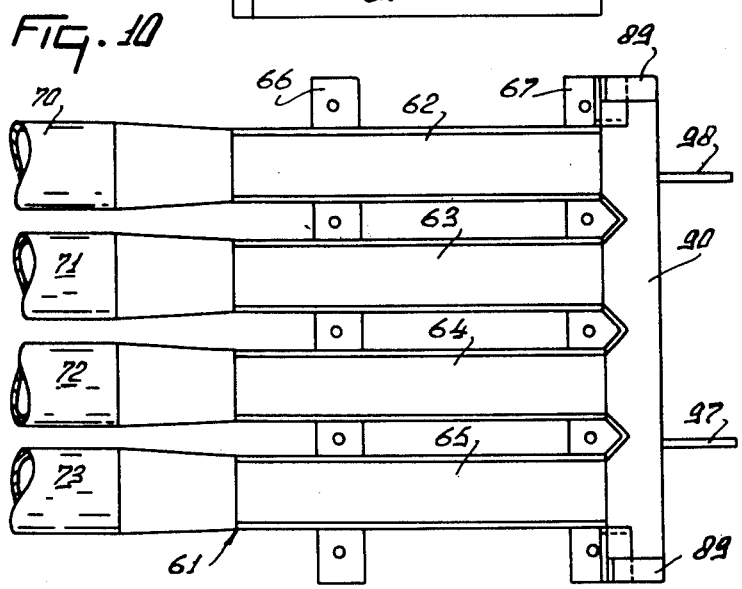

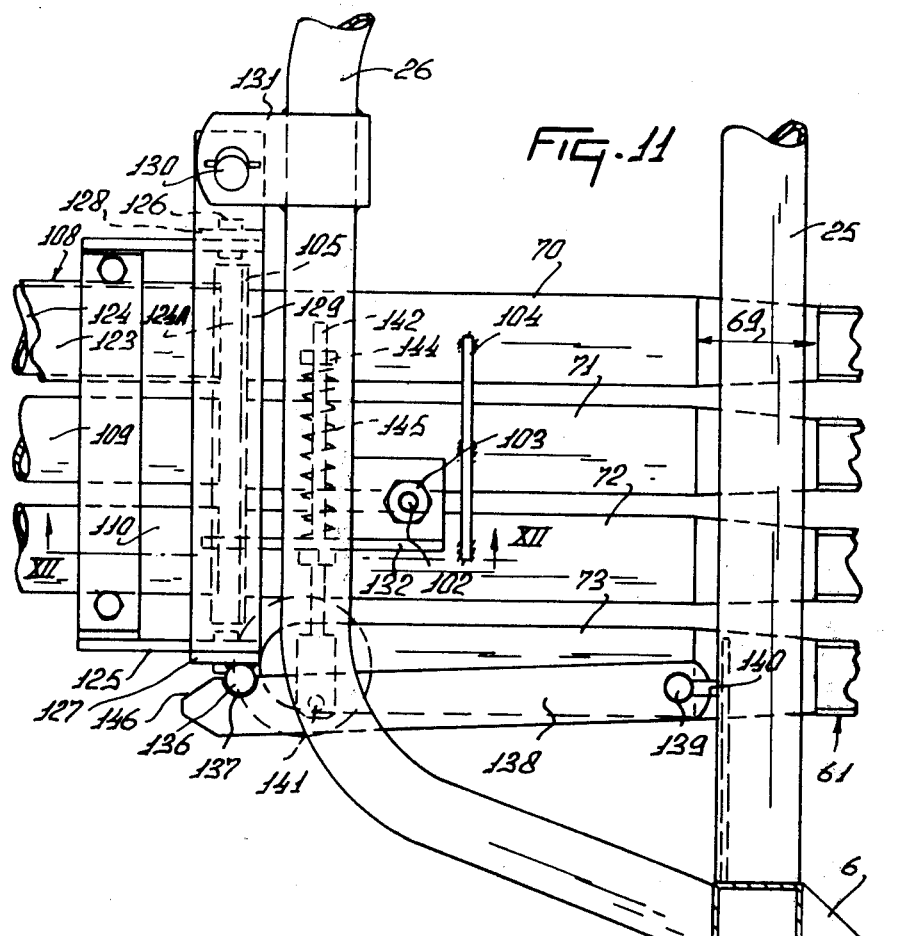
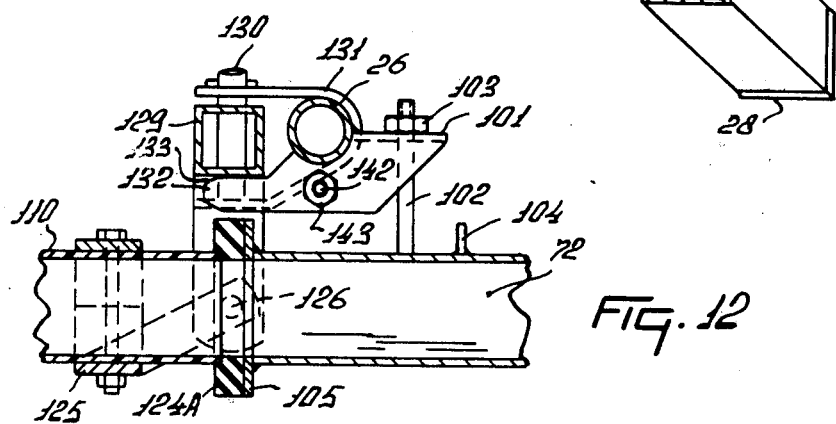

SPREADING IMPLEMENTS

Figure 2:
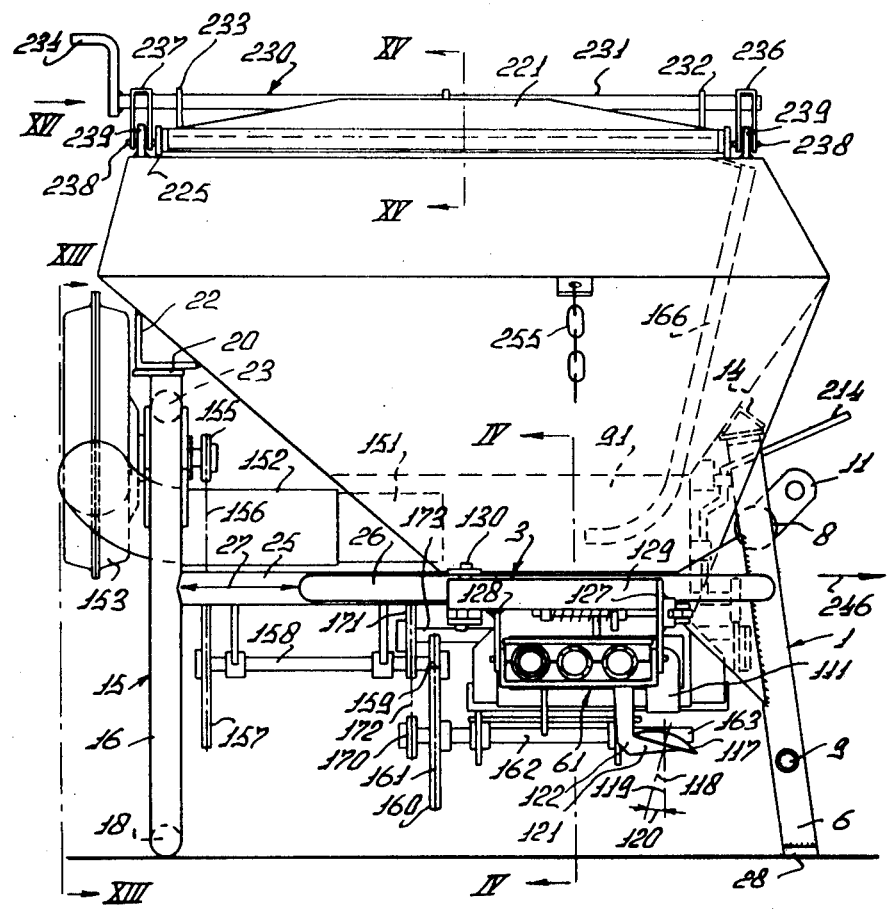
Figure 3:
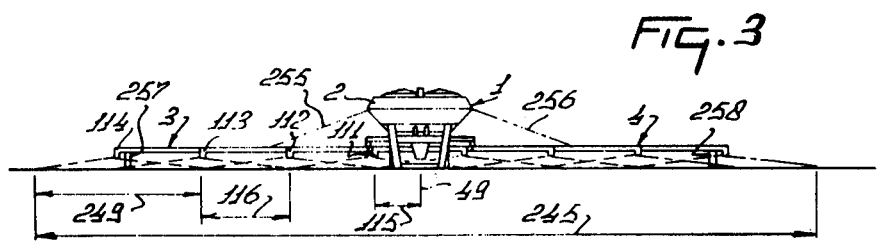
Figure 4:
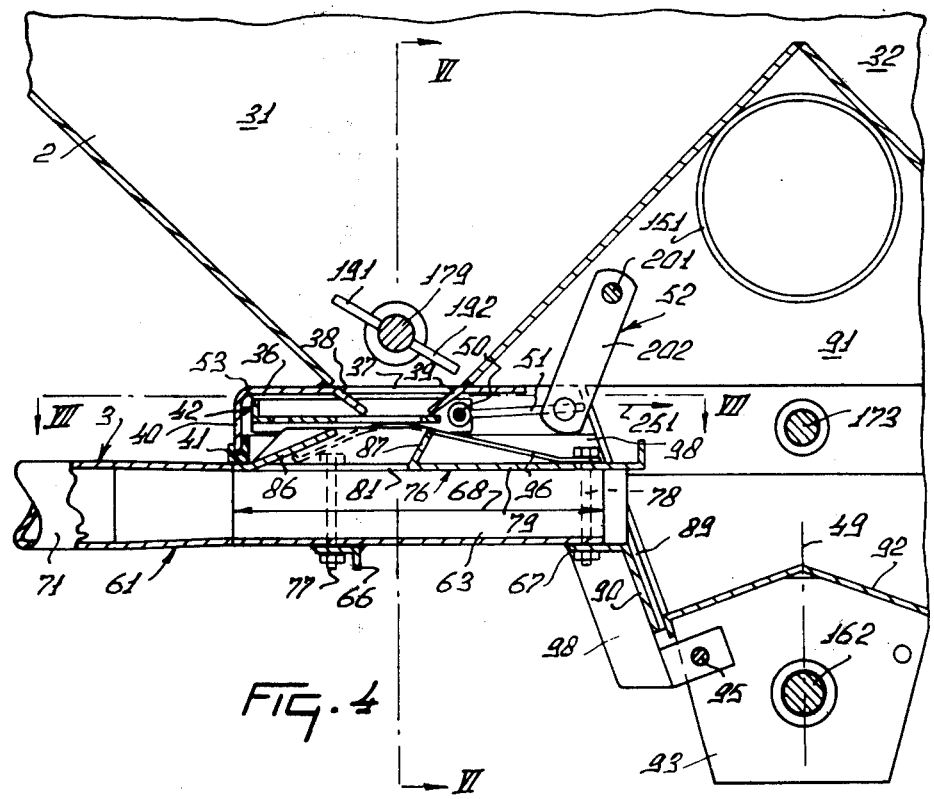
Figure 5:
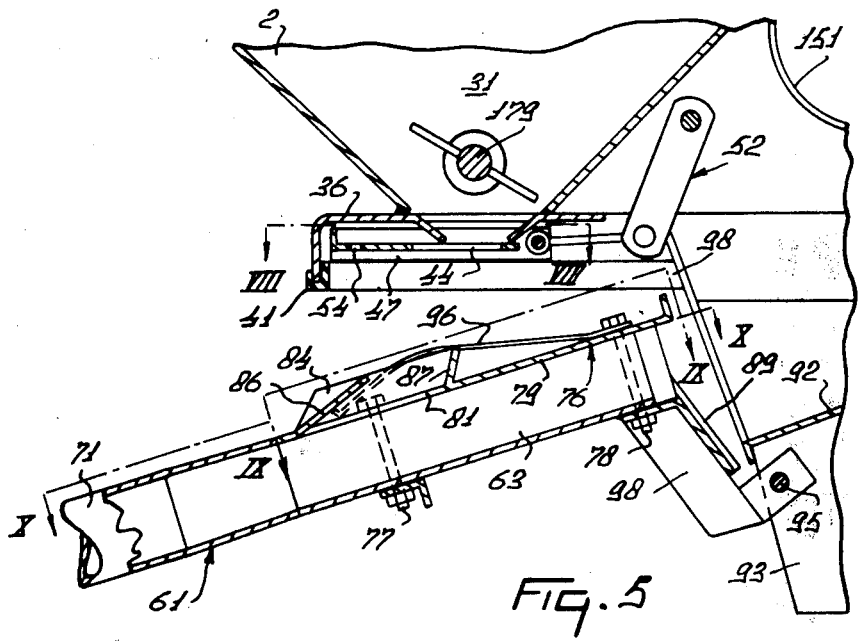
Figure 6:
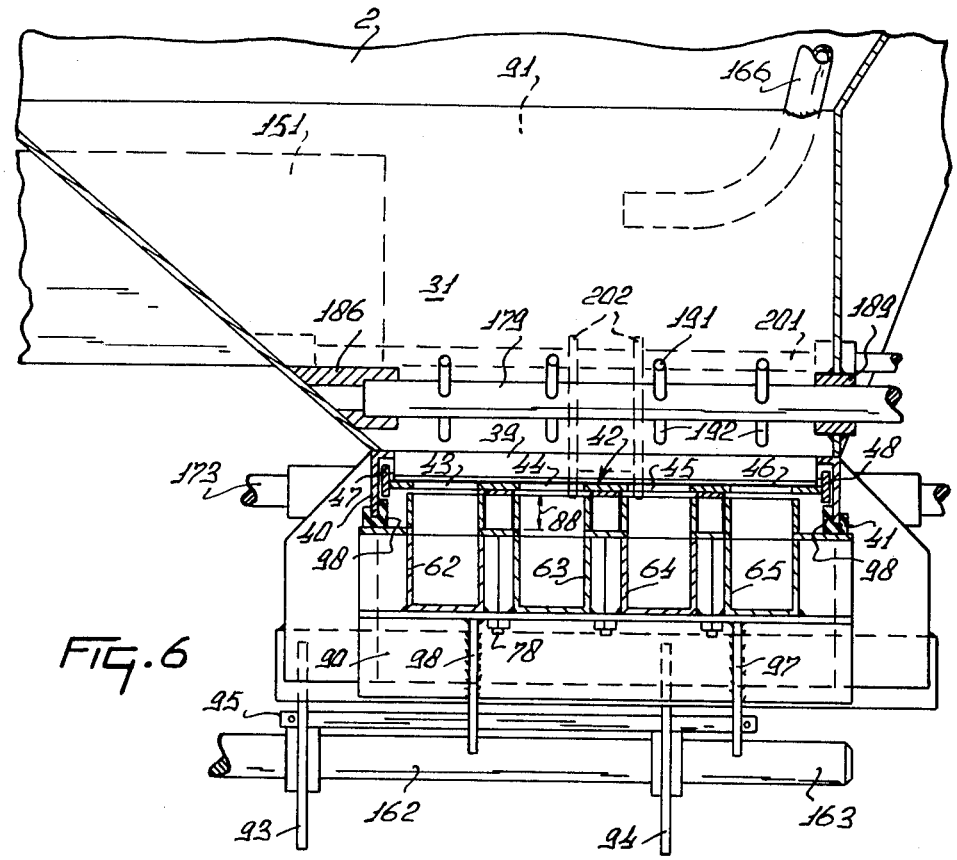
Figure 7:
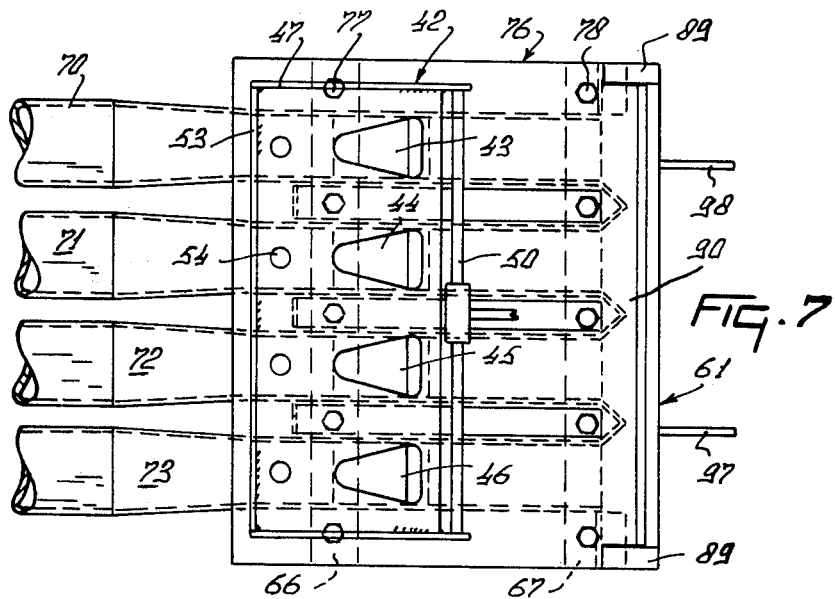
Figure 13:
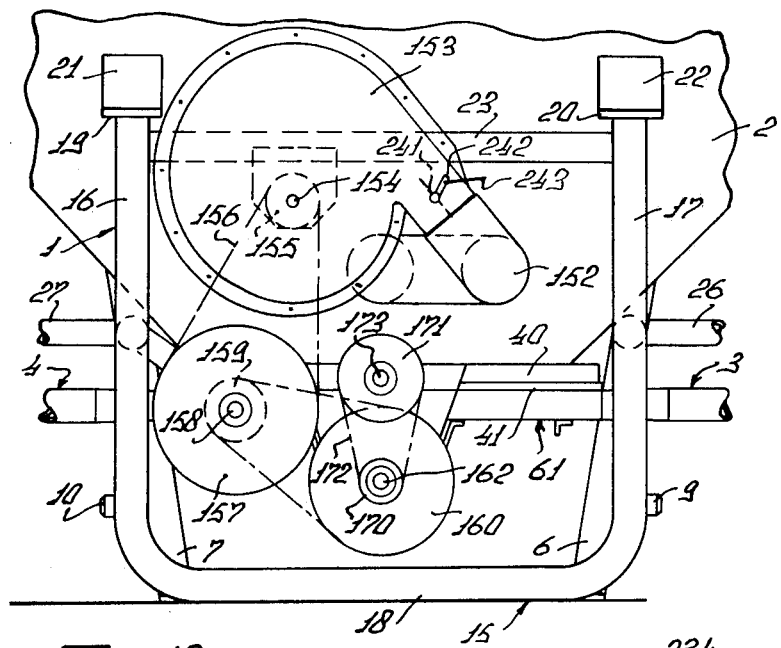
Figure 15:
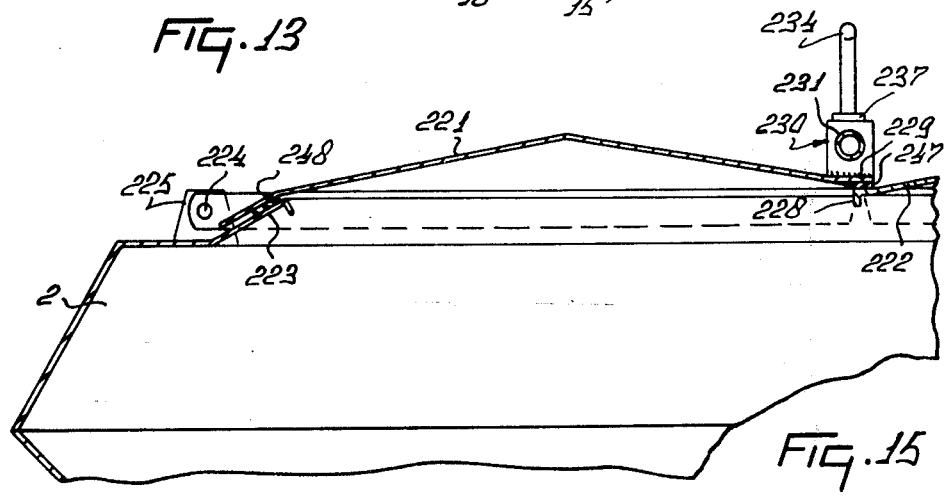
Figure 16:
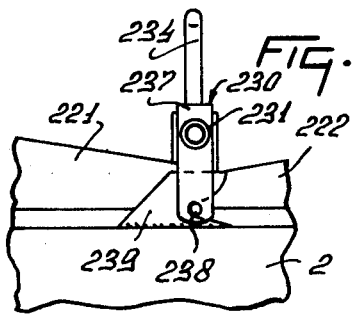
Figure 14:
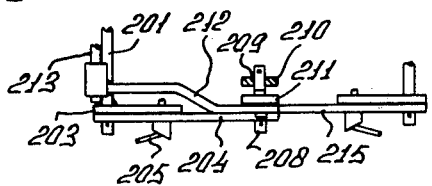
Figure 17:
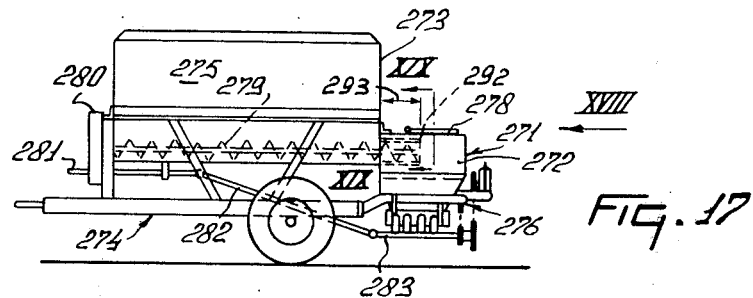
Figure 18:
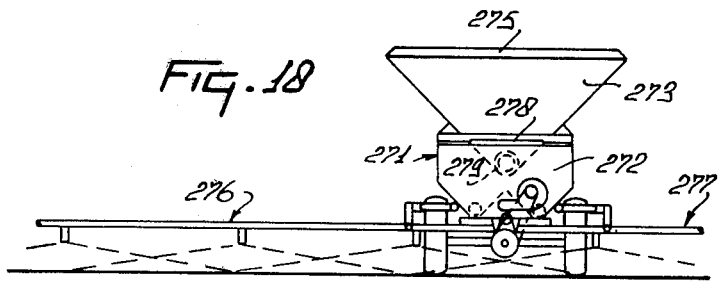
Figure 19:
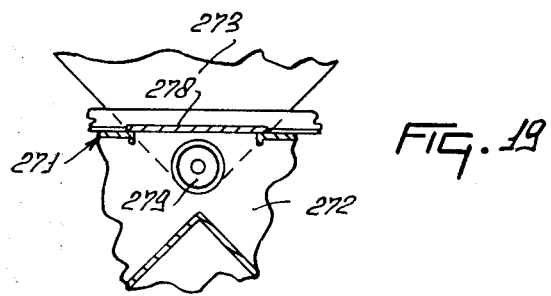

For a better understanding of the invention, and to show how the same may be carried into effect, reference will now be made, by way of example, to the accompanying drawings, in which:

FIG. 1 is a front elevation of a spreading implement in accordance with the invention, FIG. 2 is a side elevation as seen in the direction indicated by an arrow II in Figure 1, FIG. 3 is a front elevation of the implement of FIGS. 1 and 2, to a considerably reduced scale, diagrammatically illustrating operation of the implement, FIG. 4 is a section, to an enlarged scale, taken on the line IV—IV in FIG. 2, FIG. 5 is substantially the same view as FIG. 4 but illustrates parts of the implement in different positions, FIG. 6 is a section taken on the line VI—VI in FIG. 4, FIG. 7 is a section taken on the line VII—VII in FIG. 4, FIG. 8 is a section taken on the line VIII—VIII in FIG. 5, FIG. 9 is a section taken on the line IX—IX in FIG. 5, FIG. 10 is a section taken on the line X—X in FIG. 5, FIG. 11 is a section, to an enlarged scale, taken on the line XI—XI in FIG. 1, FIG. 12 is a section taken on the line XII—XII in FIG. 11, FIG. 13 is a rear elevation of the implement as seen on the line XIII—XIII in FIG. 2, FIG. 14, is a section, to an enlarged scale, taken on the line XIV—XIV in FIG. 1, FIG. 15 is a section, to an enlarged scale, taken on the line XV—XV in FIG. 2, FIG. 16 is an elevation, to an enlarged scale, as seen in the direction indicated by an arrow XVI in FIG. 2, FIG. 17 is a diagrammatic side elevation illustrating an alternative spreading implement in accordance with the invention, FIG. 18 is a rear elevation as seen in the direction indicated by an arrow XVIII in FIG. 17, and FIG. 19 is a section, to an enlarged scale, taken along the line XIX—XIX in FIG. 17.

Referring to FIGS. 1 to 16 of the drawings, the spreading implement which is illustrated has a frame 1 which carries a hopper or container 2 and two groups of distributor pipes 3 and 4 which project from opposite sides of the implement. The groups of pipes 3 and 4 serve to conduct material from the hopper or container 2 to locations at which it will be distributed over the ground surface in the use of the implement. Two downwardly convergent frame beams 6 and 7 form part of the frame 1 at the front of the implement and are interconnected towards their upper ends by a transverse substantially horizontal frame beam 8. The beams 6 and 7 carry, towards their lower ends, substantially horizontally aligned pins 9 and 10 respectively which pins are intended for connecting the frame of the implement to the free ends of the lower lifting links of a three-point lifting device or hitch carried by an agricultural tractor or other operating vehicle. A pair of forwardly projecting lugs 11 is provided in a central region of the substantially horizontal frame beam 8 for pivotal connection to the free end of the upper adjustable lifting link of such a three-point lifting device or hitch. Supports 12 and 13 are carried at the upper ends of the frame beams 6 and 7 and a substantially horizontal beam 14 secured to the front of the hopper or container 2 bears downwardly upon those supports and is fastened thereto. The lowermost ends of the two beams 6 and 7 carry corresponding foot plates 28 and 29 which are employed when the implement is standing on the ground. The frame 1 includes, at the rear of the implement, a beam 15 of substantially U-shaped configuration, said beam 15 having upright limbs 16 and 17 and an interconnecting base 18. Support plates 19 and 20 are secured to the upper ends of the limbs 16 and 17 respectively of the beam 15 and cooperating support brackets 21 and 22 that are secured to a rear wall of the hopper or container 2 are fastened to said support plates 19 and 20. The limbs 16 and 17 of the beam 15 are also interconnected, immediately beneath the support plates 19 and 20, by a horizontal frame beam 23. Substantially horizontal side beams 24 and 25 rigidly interconnect the beam 6 and the limb 17, and the beam 7 and the limb 16, respectively. A supporting wing beam 26 has one of its ends secured to the beam 6 at the level of the beam 25 and its opposite end secured to that beam 25 at a distance 5 (Figure 2) in front of the beam 15. A further supporting wing beam 27 sustantially symmetrically interconnects the beam 7 and the beam 24 at the opposite side of the frame 1 of the implement.

The hopper or container 2 has two outlet spouts 31 and 32 that are apaced apart from one another in a horizontal direction that is perpendicular to the intended direction of operative travel of the implement which direction is indicated by an arrow 246 in FIG. 2 of the drawings. The lowermost ends of the two spouts 31 and 32 are substantially symmetrically identical and communicate with corresponding flow control of "dosing" members and with corresponding feeding members, said flow control and feeding members being in communication with the corresponding groups 3 and 4 of distributor pipes. Since the flow control or dosing members, the feeding members and the distributor pipe groups 3 and 4 are substantially symmetrically identical, the drawings show only those members (and the pipe group 3) that correspond to the outlet spout 31 in detail.

The open end of the outlet spout 31 is welded or otherwise rigidly secured to a supporting plate 36 in which a slot-shaped delivery port 37 is formed. As viewed lengthwise of the slotted delivery port 37 (FIG. 4), that port is of funnel-configuration exhibiting two downwardly convergent walls 38 and 39. The supporting plate 36 has a downwardly bent-over rim 40 whose lowermost edge carries a sealing strip 41 formed from a material such as foamed rubber or a synthetic plastics foam. The previously mentioned flow control or dosing member is designated by the reference 42 and is located beneath the delivery port 37, said flow control member 42 having four holes 43, 44, 45 and 46 that can be seen in FIGS. 6 to 8 of the drawings. Each of the holes 43 to 46 is of substantially isosceles triangular configuration, its three corners being rounded off. The front and rear ends of the flow control member 42 have upright rims 47 and 48 that project both above and below the general plane of the plate 35 which principally affords that member (see FIGS. 4 and 6 of the drawings). A shaft 50 interconnects the ends of the rims 47 and 48 that are closest to a vertical plane of substantial symmetry 49 (FIG. 4) of the implement that extends parallel to the direction 246 and said shaft 50 has one end of a coupling rod 51 connected to its mid point (see FIGS. 7 and 8 of the drawings). The opposite end of the coupling rod 51 is connected to a setting mechanism 52. The edge of the flow control member plate 35 that is remote from the plane 49 has an upright rim 53 (FIGS. 4 and 7 of the drawings) near which said plate is formed with four circular holes 54 each of which is in line with a corresponding one of the apices of the four triangular holes 43, 44, 45 and 46.

An inlet nozzle 61 (FIGS. 4 and 5) of the distributor pipe group 3 is arranged beneath the flow control member 42 and comprises for inlet channels 62, 63, 64 and 65 each of which is of the same right-angled channel-shaped cross-section with the limbs of the channel directed substantially vertically upwards. The four channels 60 to 65 are welded to a common connecting strip 66. The ends of the four channels 62 to 65 that are closest to the plane 49 are also inter-connected by a further strip 67 to which, once again, they are all welded. Four tubular connectors 69 place the four channels 62 to 65 in communication with corresponding ones of four tubes 70 to 73. The connectors 69 are shaped in such a way that the ends thereof that join the channels 62 to 65 are of rectangular cross-section while the ends thereof that join the tubes 70 to 73 are of circular cross-sections that match the circular cross-sections of those tubes. The channels 62 to 65, the tubular connectors 69 and the tubes 70 to 73 principally afford the inlet nozzle 61 that corresponds to the distributor pipe group 3, each of the channels 62 to 65 extending throughout a distance 68 (Figure 4) along which its top is closed by a cover 76 throughout a significant part of its length. The cover 76 is detachably secured to the inlet nozzle 61 by bolts 77 and 78 and comprises a plate 79 formed with four apertures 80, 81, 82 and 83 (FIGS. 4 and 9 of the drawings). Each of the apertures 80 to 83 has a corresponding feeding member which is afforded by opposed upright rims 84 and 85 and by opposed relatively inclined rims 86 and 87. The four rims 84 to 87 project above the plate 79 throughout a distance 88 (FIG. 6) and their uppermost edges are all parallel to the general plane of the plate 79. The opposed upright rims 84 and 85 extend parallel to the longitudinal axes of the inlet channels 62 to 65 and the inclined rims 86 and 87 are disposed between them. Both the inclined rims 86 and 87 of each pair are inclined upwardly away from the plate 79 towards the plane 49 (FIG. 4) the rims 86 being less steeply inclined to the general plane of the plate 79 than are the rims 87. An opening is formed between the upper edges of each set of four rims 84, 85, 86 and 87 and these four openings are all located beneath the slot-like delivery port 37. The feeding members that are afforded by the rims 84 to 87 define inlet spouts for the corresponding four apertures 80 to 83, those spouts leading downwardly into the channels 62 to 65 in directions that are orientated towards the corresponding tubes 70 to 73. This can be seen in respect of the aperture 81 in FIG. 4 of the drawings. The plate that principally affords the flow control member 42 can occupy a position in which its four holes 43 to 46 are located in register with the upper inlet ends of the four spouts that have just been discussed. The upper surface of the cover 76 is provided with three leaf springs 96, each spring 96 having one of its ends secured to the upper surface of th plate 79 by a corresponding one of the bolts 78. The opposite ends of the springs 96 bear downwardly on the top of the plate 79 at locations between corresponding upright rims 84 and 85 (see FIG. 9 of the drawings). The leaf springs 96 are shaped, between their ends, so that they press the flow control member 42 upwardly into substantially sealing contact with the lowermost edges of the walls 38 and 39 of the delivery port 37 (see FIG. 4 of the drawings).

An air chamber 91 is formed substantially beneath the hopper or container 2 between oppositely inclined walls of its two outlet spouts 31 and 32. The chamber 91 is of completely closed configuration and has a bottom wall 92 of inverted shallow V-shaped configuration, the point of the "V" substantially coinciding with the plane 49 (see FIG. 4). Fastening plates 93 and 94 (FIG. 6) project downwardly from the bottom wall 92 of the air chamber 91 in horizontally spaced apart relationship and carry a pivot shaft 95 to which the inlet nozzle 61 of the distributor pipe group 3 is connected by strips 97 and 98. The inlet nozzle 61 has a sealing plate 90 that is secured to the strips 97 and 98 and to the previously mentioned connecting strip 67. An edge region of the effective surface of the sealing plate 90 is provided with a layer of compressible sealing material 89 such as foamed rubber or a foamed synthetic plastics material. The sealing material 89 normally bears against edges of walls of the air chamber 91 such as the edge 97 of its bottom wall 92 that can be seen in FIG. 4 of the drawings. The upper surface of the plate 79 which principally affords the cover 76 bears against the sealing strip 41 on the rim 40 of the supporting plate 36 and the inlet nozzle 61 thus extends in substantially sealing relationship with the air chamber 91.

The end of the nozzle 61 that is remote from the strips 97 and 98 is connected to the supporting wing beam 26 for which purpose that beam has a horizontal lug 101 (FIGS. 11 and 12) through which a vertical stud 102 is entered, the connection being maintained by a nut 103 screwed onto said stud above the lug 101. The lower end of the stud 102 is rigidly secured to the inlet nozzle 61 between its tubes 71 and 72, the tubes 70, 71 and 72, but not tube 73, being interconnected on top by a strip 104 that is welded to them. The ends of the three tubes 70, 71 and 72 that are remote from the tubular connectors 69 are all coupled to one another by a flange plate 105 that is welded around their mouths in such a way that those mouths register with holes in the flange plate. The corresponding end of the fourth tube 73 communicates, or is integral, with a tube 111 (FIGS. 1, 2) and 3 of the drawings) that defines a downwardly directed right angle bend. The longitudinal axis of the tube 111 is spaced, at the downwardly directed end of that tube, from the plane 49 by a distance 115 (FIG. 3) which preferably has a magnitude of substantially 75 centimeters. It will be noted that the end of the tube 111 is closer to the plane 49 than is the flange plate 105 interconnecting the corresponding tubes 70, 71 and 72. The distributor pipe group 3 also comprises distributor pipes 108, 109, and 110 that are of dissimilar lengths but that extend in axial prolongation of the corresponding tubes 70, 71 and 72. The free ends of the pipes 108, 109 and 110 exhibit downwardly directed outlet ends 112, 113 and 114 (FIG. 3) respectively, these outlet ends being at differing distances from the plane 49. It will be remembered that the outlet of the tube 111 is spaced from the plane 49 by a distance of substantially 75 centimeters whereas the distances 116 between the tube 111 and the successive outlet ends 112, 113 and 114 preferably each have a magnitude of substantially 150 centimeters.

A cap-shaped distributor plate 117 whose convex surface is directed upwardly is lcated beneath the outlet end of the tube 111 and, although not illustrated in the drawings, beneath each of the outlet ends 112, 113 and 114. The plate 117 has a circular edge whose center of curvature is coincident with the central axis 118 (FIG. 2) of the capshaped configuration of the plate, said central axis 118 being inclined by an angle 120 (having a magnitude of substantially 15°) to the longitudinal axis 119 of the outlet end of the tube 111. The distibutor plate 117 is held in its appointed position, from beneath, by a support 121 which comprises a substantially L-shaped strip 122 fastened to the bottom of the associated tube 72 near the tube 73. The arrangement of the distributor plates that correspond to the outlet ends 112, 113 and 114 of the distributor pipes 108, 109 and 110 is substantially identical except that, in the case of the outlet end 114, the strip that corresponds to the strip 122 that has just been described is fastened to the pipe 108 of which that end forms a part rather than to a meighbouring pipe.

The longest pipe 108 comprises an outer metal tube 123 and an inner synthetic plastics tube 124 whereas the shorter pipes 109 and 110 are afforded by synthetic plastics tubes alone without an outer metal sheath. The inlet ends of the three pipes 108, 109 and 110 are all interconnected by a bracket 125 (FIGS. 11 and 12 of the drawings), said bracket 125 being pivotably mounted by aligned pivot pins 126 that connect it to strips 127 and 128 which depend from a supporting arm 129. The same ends of the pipes 108, 109 and 110 are also interconnected by a sealing block 124A that is formed from a compressible sealing material such as, for example, foam rubber or a foamed synthetic plastic. The sealing block 124A defines holes that register with the inlet ends of the pipes 108, 109 and 110 and normally bears against the flange plate 105 at the ends of the tubes 70, 71 and 72 in the manner that can be seen in FIG. 12 of the drawings. The supporting arm 129 is fastened to an upright shaft 130 that is turnably connected to a bracket 131 rigidly fastened to the supporting wing beam 26. The shaft 130 is not strictly vertically disposed but is arranged in such a way that its upper end is a little further advanced with respect to the direction 246 than is its lower end. The supporting arm 129 is also sustained from beneath by a support 132 that is fastened to the wing beam 26 and to one edge of the lug 101. The free end of the support 132, that is located beneath the arm 129, is formed with an upwardly directed bevelled edge 133. The depending strip 127 carries a substantially vertical pin 136 which is normally lodged in a matchingly shaped notch 137 at one side of a lock bolt 138. The lock bolt 138 is turnably connected by a substantially vertical pivot pin 139 to a strip 140 fastened to the side beam 25 of the frame 1. One end of a pin 142 carries a fork which is turnably connected to the lock bolt 138 by a pivot pin 141 that is located quite near to the notch 137. The pin 142 passes, with clearance, through a hole in the support 132 and carries a stop nut 143 on a long screw-threaded portion thereof, the stop nut 143 bearing against one side of the support 132. A further stop nut 144 is adjustably mounted on the pin 142 near the end thereof that is remote from the pivot pin 141 and a helical compression spring 145 is wound around the pin 142 so as to bear between the adjustable stop nut 144 and the side of the support 132 which faces that stop nut. The lock bolt 138 is formed with a bevelled edge 146 at the end thereof that is remote from the pivot pin 139 but close to the notch 137.

An air supply pipe 151 (FIGS 2, 4 and 6) opens into the air chamber 91 and is fastened to a wall of that chamber. A flexible tube 152 connects the external end of the supply pipe 151 to the air delivery side of a fan or blower 153. An impeller of the fan or blower 153 has a driving shaft 154 which carries a sprocket wheel or pulley 155. And endless transmission chain or belt extends around the wheel or pulley 155 and around a larger sprocket wheel or pulley 157 fastened to one end of a rotary shaft 158. Sprocket wheels or pulleys 159 and 160 and a co-operating transmission chain or belt 161 place the shaft 158 in driven connection with a rotary driving shaft 162 which has a leading (with respect to the direction 246) end 163 that is splined or otherwise keyed to enable it to be placed in driven connection with the power take-off shaft of an agricultural tractor or other operating vehicle by way of an intermediate telescopic transmission shaft (not shown) which is of a construction that is known per se having universal joints at its opposite ends. A pipe 166 (FIGS. 1 and 2) has its lower input end located inside the air chamber 91 and its upper delivery end located inside the hopper 2 close to the top of the latter.

The rotary driving shaft 162 that has been mentioned above also carries a sprocket wheel or pulley 170 which is in driving communication with a further larger sprocket wheel 171 mounted on a shaft 173 by way of an endless transmission chain or belt 172. The shaft 173 is rotatably journalled in the walls of the air chamber 91 and extends through that chamber in a direction substantially parallel to the direction 246. A short strip 174 perpendicularly secured to the shaft 173 where it projects beyond the front of the air chamber 91 (see FIG. 1) and the ends of two driving arms 176 and 177 are pivotally connected to the end of the strip 174 that is remote from the shaft 173 by a pin 175. The end of the arm 176 that is remote from the pin 175 is pivotally connected to a short arm 178 that projects perpendicularly from the leading end of an agitator shaft 179 at a location beyond the front wall of the outlet spout 31 of the hopper 2. It will be seen from FIGS. 1 and 4, in particular, of the drawings that the agitator shaft 179 extends through the outlet spout 31 near the bottom of the latter and it will be evident from FIG. 1 of the drawings that the driving arm 177 is similarly connected, in a substantially symmetrical manner, to a short arm 180 carried by an agitator shaft 181 that extends into and through the outlet spout 32. The agitator shaft 179 that is located in the outlet spout 31 is substantially horizontally disposed and extends parallel to the direction 246. The rear end of the shaft 179 is rockably journalled in a bearing 186 (FIG. 6) carried by the rear wall of the spout 31 and a region towards the leading end of the shaft 179 is similarly journalled in an aligned bearing 189 carried by the front wall of said spout. The shaft 179 is provided, inside the spout 31, with a plurality, such as four, of pairs of diametrically opposed agitator rods 191 and 192, said pairs of rods 191 and 192 being spaced apart from one another at regular intervals along the portion of the shaft 179 that is located within the spout 31.

The aforementioned setting mechanism 52 for the flow control or dosing member 42 comprises a shaft 201 that is turnably journalled in bearings carried by the front and rear walls of the air chamber 91. Two strips 202 are secured to the shaft 201 in spaced apart relationship and the end of the coupling rod 51 that is remote from the shaft 50 is pivotably connected to the ends of said strips 202 that are remote from the shaft 201. The shaft 201 has a strip 203 (FIG. 14) perpendicularly secured to it outside the air chamber 91 and a further longer strip is also mounted thereon but in a freely turnable manner. The strip 204 is provided with a locking pin 205 which can be employed to secure the strip 204 to the strip 203 and thus fix its angular inclination relative to the shaft 201 but the pin 205 can be maintained in a withdrawn condition in which the strip 204 is not fixed to the strip 203. The end of the strip 204 remote from the shaft 201 is formed with an elongated slot 207 through which is entered a pin 208. The pin 208 is also movable along a slot 209 formed in an upright supporting strip 210. The pin 208 is fixed to an arm 211 whose upper end is pivotally connected to the free end of an arm 212, the latter arm being turnable by way of a sleeve about a shaft 213 that is fixed to the hopper or container 2. The arm 212 and its sleeve are also rigidly connected to a control arm 214 (FIGS. 1 and 2) located at the front of the implement. It will be noted that a strip 215 that substantially symmetrically corresponds to the strip 204 interconnects the pin 208 and a shaft (equivalent to the shaft 201) of a setting mechanism for the flow control or dosing member of the outlet spout 32.

The top of the hopper 2 is closed by two lids 221 and 222. When closed, the lids 221 and 222 co-operate with an inclined rim 223 (FIG. 15) at the upper edges of the hopper walls. The lid 221 is connected by a pivotal shaft 224 to lugs 225 mounted on the top of the hopper 2 adjacent the rim 223. The lid 222 is similarly connected to the hopper 2 by a pivotal shaft 226 and lugs 227. The lid 222 has a downwardly bent-over rim 228 part of which is arranged to co-operate sealingly with a rim 229 of the lid 221. A locking mechanism 230 is provided on top of the flat rim 229 of the lid 221, said mechanism 230 comprising a shaft 231 that is turnably mounted in lugs 232 and 233 (FIG. 2) that project upwardly from the top of the rim 229 of the lid 221. The shaft 231 has a crank handle 234 at one end and, at the opposite end thereof and at a location close to the handle 234, said shaft 231 is provided with hooks 236 and 237 respectively, those hooks incorporating pins 238 that co-operate with latch plates 239 mounted on top of the hopper 2 in the manner which can be seen in FIG. 16 of the drawings. The air supply pipe 151 is provided at the fan or blower 153 with a flow control vane 241 (FIG. 13), that vane being coupled by a rod mechanism 242 to a setting arm 243.

The implement that has been described is intended primarily, but not exclusively, for distributing powdered and granular materials over the surface of the soil, such material being, for example, artificial fertilisers and the like, The implement is advantageously connectecd to the three-point lifting device or hitch of an agricultural tractor or other operating vehicle by the pins 9 and 10 and the lugs 11 to enable it to be moved over the ground surface but other ways of supporting the implement for movement over the ground could be employed as alternatives. The leading splined or otherwise keyed end 163 of the driving shaft 162 is placed in driven connection with the power take-off shaft of the agricultural tractor or other operating vehicle by means of the previously mentioned known telescopic transmission shaft having unversal joints at its opposite ends and powdered or granular artificial fertiliser or other material that is to be spread over the land is introduced into the hopper 2 after opening the lids 221 and 222 thereof. During progress of the implement over the ground in the direction 246 with the lids 221 and 222 closed, it can spread the artificial fertiliser or other material throughout a strip of ground having a width 245 as shown in FIG. 3 of the drawings. The fan or blower 153 is driven from the shaft 162 and produces a stream of air which passes from that fan or blower through the tube 152 and pipe 151 into the air chamber 91. Air leaves the chamber 91 by way of the channels 62, 63, 64 and 65 from which is passes to the tubes 70, 71, 72 and 73 and thus to the distribution pipes 108, 109 and 110 and to the outlet tube 111. The artificial fertiliser or other material that is to be spread is introduced into the air streams in the channels 62, 63, 64 and 65, that material passing downwardly from the outlet spouts 31 and and 32 through the delivery ports 37 and the holes 43, 44, 45 and 46 into the apertures 80, 81, 82 and 83 in the cover 76 which apertures open into the tops of the channels of each of the two inlet nozzles 61. The artificial fertiliser or other material is entrained in the air streams and eventually leaves the tubes 111 and the outlet ends of the distribution pipes 108, 109 and 110 with those air streams. As all of the outlet ends are downwardly directed, most of the material strikes the corresponding distribution plates 117 whose shapes and dispositions are such that the material from each outlet is spread over a corresponding strip having a width 249 FIG. 3) whose magnitude in the embodiment which is being described by way of example is substantially 3 meters.

The inclined disposition of each distributor plate 117 that has previously been discussed can be seen in FIG. 2 of the drawings and the principal reason for this arrangement is to ensure a substantially uniform distribution of material over most of the corresponding width 249 with, however, a reduced delivery of material per unit area towards the margins of the strip in question. The width 249 of each strip of land that receives material from the outlet end of a coresponding distributor pipe is substantially twice the aforementioned distance 116 (FIG. 3) between immediately neighbouring pipe outlets. It will be apparent from FIG. 3 of the drawings that, with the exception of portions of the strips of land that are supplied with material by the longest pipes of the two groups 3 and 4, those portions being ones that are furthest removed from the plane 49, said strips overlap one another throughout the working width of the implement, the arrangement being such that a substantially uniform quantity of material per unit area of ground traversed by the implement is produced provided that the implement is moved at a substantially constant speed. When spreading artificial fertiliser or the like over a field, the implement will normally be operated in such a way that the paths of travel of successive traverses across the field will overlap one another to some extent so that this will compensate for the smaller quantity of material per unit area that is supplied to the opposite edge regions of the path of travel as has just been discussed with reference to FIG. 3 of the drawings. The distributor pipe groups 3 and 4 are substantially symmetrically identical about the plane 49 and, accordingly, no further description of the pipe group 4 is required. The inclined dispositions of the rims 86 and 87 and the disposition of each cover 76 are such that artificial fertiliser or other material which passes through the feeding members for the four apertures 80 to 83 that correspond to each outlet spout 31 and 32 move into the streams of air through the channels 62 to 65 in directions which have significant components that are parallel to the directions of movement of the air streams through those channels. This facilitates rapid and uniform entrainment of the material in the streams of air.

The quantity of artificial fertiliser or other material that is to be spread over the land per unit time, and hence the quantity that is spread per unit area of the land (assuming a substantially constant speed of travel of the implement), is controlled by appropriate positioning of each flow control member 42 beneath each slotted delivery port 37. The holes 43 to 46 will be fully open, or will be masked to a desired extent, in accordance with the positions of the flow control members 42 relative to the ports 37. In the position of the flow control member 42 which is illustrated in FIG. 4 of the drawings relative to the corresponding delivery port 37, the holes 43 to 46 are substantially completely unmasked so that a maximum quantity of material per unit time can pass through them. However, upon displacing the flow control member 42 in the direction indicated by an arrow 251 in FIG. 4, the broad bases of the substantially triangular holes 43 to 46 will pass out of register with the port 37 so that the effective sizes of the holes will get smaller although they will remain basically triangular in shape. Displacement of the flow control member 42 in the direction of the arrow 251, or in relatively opposite direction to increase the quantity of material that is spread per unit time, is accomplished by appropriate manipulation of the control arm 214 which arm, as will be evident from FIG. 2 of the drawings, projects forwardly from the front of the implement to a location where, generally speaking, it will be accessible to the driver of an operating agricultural tractor without that driver having to leave the driving seat. The position of the arm 214 that is shown in FIG. 1 of the drawings corresponds to positions of the flow control members 42 in which the holes 43 to 46 are open to substantially their maximum extent. Upon displacing the arm 214 in the direction indicated by an arrow 252 in FIG. 1 of the drawings, the arm 212 is turned upwardly about its pivotal shaft 213. This causes the arm 211 to move the pin 208 upwardly with the result that the strips 204 and 203 turn the shaft 201 and the strip 215 (FIG. 14) and the shorter strip to which it is normally linked by a locking pin turn the shaft that corresponds to the shaft 201 in respect of the outlet spout 32. It will be appreciated that, when the strip 203 is coupled to the longer strip 204 by the locking pin 205, the strip 204 will be effectively rigid with the shaft 201 so that turning of the strip 204 necessarily causes a similar angular displacement of the shaft 201. The strips 202 are thus turned and this movement is transmitted by the coupling rod 51 to the corresponding shaft 50 and corresponding flow control member 42. The parts that substantially symmetrically correspond in respect of the outlet spout 32 are moved in a similar manner so that equal quantities of material per unit time will flow through the two outlet spouts 31 and 32 to the pipes of the groups 3 and 4 respectively. If it is desired to spread material at substantially only one side or the other of the plane 49 (FIG. 4), then, initially, both flow control member 42 are set to positions in which th corresponding holes 43 to 46 are completely masked thus preventing material from leaving both spouts 31 and 32. Upon the assumption that it is desired to distribute material only from the pipes of the group 4 but not from the pipes of the group 3, the locking pin 205 (FIG. 14) is withdrawn to its inoperative position thus rendering the strip 204 free of connection with the strip 203. When the control arm 214 is moved to open the holes 43 to 46 of the flow control member 42 that correspponds to the outlet srout 32, the strip 204 (FIG. 14) will merely turn freely about the shaft 201 and will not displace the strip 203 and the shaft 201 with it. Thus, the flow control member 42 corresponding to the outlet spout 31 will remain in a position in which its holes 43 to 46 are closed and no material will be supplied to the pipes of the group 3. Since the leaf springs 96 constantly urge the flow control member 42 into engagement with the lower edges of the walls 38 and 39, said member 42 will tend to remain in its existing position even when subject to some vibration during operation at times when it is not effectively coupled to the control arm 214. Appropriate manipulations can be made to allow material to be delivered to substantially only the left-hand side of the plane 49 or to substantially only the right-hand side thereof or throughout the whole working width 245 (FIG. 3).

When a large quantity of material per unit time is to be delivered through the pipes of the groups 3 and 4, it is usually desirable that there should be strong streams of air through those pipes whereas, when smaller quantities of material per unit time are to be spread, somewhat weaker streams of air are appropriate. Control in this respect is achieved by manipulating the setting arm 243 (FIG. 13) to cause to flow control vane 241 to obstruct the flow of air from the fan or blower 153 to the pipe 151 to a lesser or greater extent. It is also noted that increasing and decreasing the strengths of the streams of air that flow though the distributor pipes influences to some extent the width 249 (FIG. 3) of the strip of land which is supplied with material from each pipe during the operation of the implement. Satisfactory distribution of the material is facilitated because each of the distributor pipes is substantially straight except for a short outlet end portion, throughout its length from the corresponding inlet aperture 80, 81, 82, or 83. It should be noted that, if considered necessary for certain types of material, the distributor plates 117 may be replaced by other distributor plates having different shapes and/or dispositions relative to the outlet ends of the pipes and that the described and illustrated plates 117 may be adjustable in position relative to the outlet ends of said pipes. The air pressure that prevails in the chamber 91 during operation of the implement is also established in the hopper 2 by way of the interconnecting pipe 166. As a result, air will emerge substantially only through the distributor pipes and there will be no tendency for air to pass from the channels 62 to 65 through the lower ends of the outlet spouts 31 and 32 into the hopper 2. The lids 221 and 222 are, to this end, sealing lids and their edges are provided with sealing strips 248 formed from foam rubber or a foamed synthetic plastics material. Air is thus substantially prevented from escaping between the edges of the lids 221 and 222 and the inclined rim 223 at the top of the hopper or container 2. A similar sealing strip 247 is provided on the lower surface of the flat rim 229 of the lid 221 and that strip co-operates with the rim 228 of the lid 222 when the two lids are closed. Under these circumstances, it is the lid 221 that keeps the lid 222 in a closed condition. The lid 221 is maintained tightly closed by employing the crank handle 234 to turn the shaft 231 about its own axis until the pins 238 of the hooks 236 and 237 engage the latch plates 239 tightly in the manner which can be seen best in FIG. 16 of the drawings.

In the example which has been described and that is illustrated in the accompanying drawings, the flow control vane 241 (FIG. 13) is manually adjustable independently of other adjustments. However, as an alternative, the flow control vane 241 may be operatively connected by a rod and pivot system, Bowden cable or the like to the setting mechanism for the flow control members 42 corresponding to the two outlet spouts 31 and 32. With such a construction, the vane 241 could be turned in a flow-restricting direction when the or each member 42 was moved to reduce the effective cross-sectional areas of the corresponding holes 43 to 46 and, conversely, it could be turned in an unthrottling direction when the control arm 214 is moved in a direction opposite to the direction indicated by the arrow 252 in FIG. 1 of the drawings.

The connection of the agitator shafts 179 and 181 to the strip 174 by the pivot pin 175 is such that, when the shaft 173 is driven, said shafts 179 and 181 oscillate about their own longitudinal axes. The agitator rods 191 and 192 that are located immediately above the delivery ports 37 are thus rocked upwardly and downwardly in the material that is to be spread so that the danger of caking or bridging of that material is greatly reduced and uniform delivery of the material to the distributor pipes proceeds without interruption during a spreading operation. Each of the distributor pipe groups 3 and 4 is supported not only by its connection to the frame 1 but also from the hopper 2 by way of suspension chains 255 and 256. Moreover, near the outlet end 114 of the longest distibutor pipe of the group 3 and near the outlet end of the corresponding distributor pipe of the group 4, slideable shoes 257 and 258 sustain the corresponding pipe groups from the ground surface. If, during its operative travel over the ground, the implement should encounter an obstacle and one or the other or both of the pipe groups 3 and 4 cannot pass that obstacle, the pipes 108, 109 and 110 and/or the corresponding pipes of the group 4 can turn about the upright axis of the shaft 130 or about the axis of the corresponding shaft of the group 4 or about both those axes. For example, if an obstruction should block movement of the pipe group 3 in the direction 246 (FIG. 2), the pin 136 (FIG. 11) rides out of the notch 137 thus freeing the pipe group 3 for pivotal movement of the shaft 130. The lock bolt 138 is turned through a few degrees about the pivot pin 139 against the action of the spring 145 as a consequence. As previously mentioned, the shaft 130 is preferably not strictly vertically disposed but is arranged so that its upper end is slightly further advanced with respect to the direction 246 than its lower end. When the pipe group 3 is released upon meeting an obstruction, it will accordingly turn rearwardly and upwardly to some extent to pass the obstruction. Once the obstruction no longer blocks progress in the direction 246, the pipe group 3 will turn forwardly and downwardly to some extent back about the shaft 130 under the action of gravity due to the inclination of that shaft to the vertical. The pin 136 eventually meets the bevelled edge 146 of the lock bolt 138 and the momentum of the returning pipe group 3 causes the spring 145 to be momentarily additionally compressed and allows the pin 136 to snap back into the notch 137. The lock bolt 138 that is loaded by the spring 145 then again prevents the pipe group 3 from turning about the shaft 130 until an obstruction is met with whose resistance to displacement will overcome the retaining effect of the spring 145. That effect can be increased or decreased as may be considered necessary by moving the stop nut 144 along the screwthreaded portion of the pin 142 to increase or decrease the initial degree of compression of the spring 145.

The pipes 108, 109 and 110 can be turned upwardly relative to the tubes 70, 71 and 72 about the axis defined by the pivot pins 126. The sealing block 12a (FIG. 12) is of such a thickness that some angular displacement of said pipes relative to said tubes about the axis defined by the pins 126 is possible without breaking the sealed connections therebetween. When the implement is to undergo inoperative transport, the pipes 108, 109 and 110 of the group 3 and the corresponding pipes of the group 4 can be turned upwardly about the substantially horizontal axes that are defined by the pins 126 and the corresponding pins at the opposite side of the plate 49 until they reach substantially vertically disposed positions. The path of travel of the implement is thus very significantly reduced. As an alternative, the same pipes of the two groups 3 and 4 could be turned rearwardly about the upright axes defined by the shaft 130 and the corresponding shaft at the opposite side of the plane 49 to produce an inoperative transport position of significantly reduced working width. In this latter position, the displaced pipes project rearwardly behind the frame 1 of the implement to a considerable extent. When the pipes of the two groups 3 and 4 are in their operative positions, the supporting arm 129 is sustained not only by the shaft 130 but also by the underlying support 132 (FIG. 12). When the pipe group 3 turns about the shaft 130, the arm 129 moves away from the support 132 but can return readily to the position illustrated in FIG. 12 of the drawings by virtue of the bevelled edge 133 of th support 132. Ths substantially symmetrically identical parts that correspond to the pipe group 4 co-operate in the same manner.

The flow control member 42 and the other parts by which material finds its way from the hopper 2 to the pipe group 3 are readily accessible for cleaning and maintenance purposes by unscrewing the nut 103 by which the inlet nozzle 61 is maintained in position relative to the supporting wing beam 26. Once this nut 103 has been temporarily removed, the nozzle 61 can be turned downwardly about the shaft 95 into the position that is shown in FIG. 5 of the drawings. The leaf springs 96 then no longer bear against the flow control member 42 and the rims 47 and 48 of the latter will be supported from beneath by the sealing strip portions 98 (see FIG. 6 of the drawings). The member 42 may be entirely removed, if required, by disconnecting it from the coupling rod 51, it then being necessary to move the member 42 lengthwise along the sealing strips 41 to free it from the other parts of the implement. This ready removability of the member 42 enables it to be replaced by alternative flow control members having holes that are different in size and/or shape to the holes 43 to 46, such holes being more suitable for the passage of materials such, purely for example, as seeds, granular or powdered herbicides and/or pesticides and the like, than are said holes 43 to 46. The flow control member 42 is somewhat tray-shaped so that any small amounts of material that penetrate past the walls 38 and 39 of the delivery port 37 can find their way into the channels 62 to 65 through the circular holes 54.

If desired, the cover 76 may be replaced by an alternative cover whih closes the tops of the channels 62 to 65 but which is formed with different feeding members for introducing material from the hopper 2 into the channels 62 to 65. Alternative flow control members may be provided together with alternative distributor pipe groups which may, for example, comprise larger numbers of distributor pipes than the groups which have been described and that are illustrated in the accompanying drawings. It will be noted again that the implement is substantially symmetrical about the plane 49 (FIG. 4) so that the distributor pipe group 4 and the parts which are associated therewith correspond to the distributor pipe group 3 and its associated parts and do not need seperate detailed description. Although the described and illustrated spreading implement is intended for connection to the three-point lifting device or hitch of an agricultural tractor or other operating vehicle, it is emphasised that it may be provided with two or more ground wheels of its own thus enabling it to be towed over the ground employing a single connection to the preceding agricultural tractor or other operating vehicle.

FIGS. 17, 18 and 19 of the drawings illustrate an alternative spreading element in accordance with the invention, said implement having a frame which is supported from the ground by two wheels and which carries a large hopper and a small hopper. A single pivotal hitch point is provided for connecting the implement to a towing agricultural tractor or other vehicle. The implement has a spreading member 271 which is basically similar to the spreading member of the implement of FIGS. 1 to 16. However, said spreading member 271 is supplied by a hopper or container 272 that is considerably smaller in size than the hopper or container 2 that has been described above. The hopper 272 is mounted in a rear region 273 of a mobile wheeled frame 274 of the implement which frame also carries, in front of the small hopper 272, a large open-topped or lidded hopper 275 whose size is such that it can contain as much as substantially 5000 kilogrammes of material to be spread. The small hopper 272 is closed at the top by a sealing lid 278. The implement has two distributor pipe groups 276 and 277 that correspond in construction and arrangement to the distributor pipe groups 3 and 4 that have been described above.

An archimedean screw auger 279 is provided to feed material from the large hopper 275 to the small hopper 272 for spreading, said auger 279 being driven at a suitably slow speed from an output shaft of a gear box 280 having a rotary input shaft 281 that is intended to be placed in driven connection with the power take-off shaft of the towing agricultural tractor or other operating vehicle through the intermediary of a telescopic transmission shaft that is of a construction which is known per se having universal joints at its opposite ends. The shaft 281 passes through the gear box 280 and its rearmost end is coupled with a driving shaft 283 of the spreading member 271 by way of an intermediate shaft 282 having universal joints at its opposite ends. The driving shaft 283 is the equivalent of the driving shaft 162 that is provided in the first embodiment. A rearmost end portion of the auger 279 extends into the small hopper 272 and is received within a cylinder 292 whose effective axial length is preferably not less than the flight pitch of the auger 279. The cylinder 270 very closely surrounds the auger 279 so that, particularly when the auger is filled with material to be spread, the interior of the small hopper 272 is not in open communication with the interior of the open-topped or lidded large hopper 275. The air chamber of the spreading member 271 (which corresponds to the previously described air chamber 91) is thus not open to the atmosphere through the interior of the small hopper 272 and the cylinder 292 so that the stream of air that is supplied by the fan or blower of the spreading member 271 is compelled to leave the implement by way of the pipes of the two groups 276 and 277 as in the first embodiment. The implement of FIGS. 17 to 19 of the drawings can be employed to spread large quantities of material over the ground without it being necessary to stop the operation at more or less frequent intervals to obtain a fresh supply of material from bulk.

Although certain features of the spreading implements that have been described and/or that are illustrated in the accompanying drawings will be set forth in the following claims as inventive features, it is emphasised that the invenion is not necessarily limited to those features and that it includes within its scope each of the parts and each of the spreading implements that has been described and/or that has been illustrated in the accompanying drawings both individually and in various combinations

What we claime is:

1. A spreading implement comprising a substantially hermetically enclosed hopper means for material to be spread and an air chamber with blower means being in communication with said hopper means, at least one delivery port in said hopper means and distributor pipe means extending outside of said hopper means adjacent said delivery port, inlet apertures in elongated channels of said distributor pipe means in communication with said delivery port during operation, a flow-control device positioned between said delivery port and said inlet apertures, said device controlling the flow of material through said delivery port to said pipe means, said channels having an inlet part that includes said inlet apertures and said inlet part being open with respect to said air chamber, whereby a stream of air from the blower means is forced through said chamber into said inlet part and material passing through said flow-control device is expelled from said channels.

2. An implement as claimed in claim 1, wherein said air chamber is located beneath said hopper means.

3. An implement as claimed in claim 2, wherein the top of said air chamber is defined by walls of two outlet spouts at the bottom of said hopper, each outlet spout having the configuration of a downwardly directed funnel.

4. An implement as claimed in claim 1, wherein the hopper means has at least one outlet spout, said outlet spout comprising a slot having a length that extends substantially parallel to the normal direction of travel of the implement.

5. An implement as claimed in claim 1, wherein the hopper means has at least one outlet spout and said flow control device has a plurality of holes that are positionable beneath said spout.

6. An implement as claimed in claim 1, wherein there are at least three pipes of said pipe means and each is in communication with a corresponding hole in said flow control device.

7. An implement as claimed in claim 1, wherein said flow control device comprises a substantial horizontal dosing plate having triangular shaped holes.

8. An implement as claimed in claim 1, wherein said pipe means includes pipes of synthetic plastic material, at least one of said pipes being enclosed in an outer metal tube to which the other pipes are fastened.

9. An implement as claimed in claim 8, wherein said one pipe is the longest of said pipes.

10. An implement as claimed in claim 1, wherein an air chamber is located beneath said hopper means and is formed with side walls that make junctions with said pipe means.

11. An implement as claimed in claim 10, wherein an inlet nozzle corresponding to the inner ends of said pipe means is pivotally connected to at least one supporting strip at the bottom of said air chamber.

12. An implement as claimed in claim 11, wherein a driving shaft is arranged for connection to a power take-off shaft of a prime mover and rotatably mounted in bearings carried by supporting strips at the bottom of said air chamber.

13. An implement as claimed in claim 1, wherein the means for producing air streams through said pipes is a blower located at the rear of a hopper of said hopper means with respect to the normal direction of travel and is connected by ducts to the rear of said air chamber.

14. An implement as claimed in claim 13, wherein said air ducts make a junction with the air chamber between two upwardly convergent walls of two outlet spouts of said hopper.

15. An implement as claimed in claim 14, wherein an impeller of said blower is connected with said driving shaft by rotary transmission members.

16. An implement as claimed in claim 15, wherein said air chamber and hopper are in pressure-balancing connection with one another.

17. An implement as claimed in claim 16, wherein said connection is maintained by a upwardly extending pipe and one end of that pipe is located in said air chamber with the opposite end opening into said hopper adjacent the top thereof.

18. An implement as claimed in claim 1, wherein an agitator is positioned adjacent said delivery port and within said hopper means.

19. An implement as claimed in claim 18, wherein said agitator comprises a shaft that extends substantially parallel to the length of said port and a plurality of agitating projections are mounted on said shaft.

20. An implement as claimed in claim 19, wherein said shaft is spaced from said port by a distance substantially equal to the length of one of said agitating projections.

21. An implement as claimed in claim 19, wherein said agitator is connected to a driving shaft of said implement by transmission members and the operative rotation of said driving shaft produces oscillation of said agitator shaft about its own longitudinal axis.

22. An implement as claimed in claim 21, wherein said hopper means has two delivery ports and there are two agitator shafts substantially horizontally positioned in corresponding relatively spaced outlet spouts of said hopper means, ends of said agitator shafts projecting from said outlet spouts and said ends being provided with arms which are pivotally coupled by further driving arms to a crank strip that is in driving engagement with said driving shaft.

23. An implement as claimed in claim 22, wherein said crank strip and driving arms are positioned at the forward side of the implement with respect to the normal direction of travel.

24. An implement as claimed in claim 1, wherein said hopper means is open at the top and at least one sealing lid closes said top.

25. An implement as claimed in claim 24, wherein said top has two pivotably mounted sealing lid portions, the pivotal mountings for said portions being hinges located in relatively remote edges of said portions and edges thereof adjoining one another when said portions are closed, said edges positioned to co-operate sealingly with each other.

26. An implement as claimed in claim 25, wherein one of said portions has a locking mechanism that clamps both lids sealingly closed.

27. An implement as claimed in claim 1, wherein said hopper means is supported on a frame which has coupling points arranged for connection to a three-point lifting device of an agricultural tractor.

28. An implement as claimed in claim 27, wherein the front of said frame, with respect to the normal direction of travel, includes two upwardly divergent beams whose upper ends are secured to a hopper, said beams being rigidly interconnected by a further coupling beam carrying lugs positioned for co-operation with the upper lifting link of the three-point lifting device.

29. An implement as claimed in claim 28, wherein lower portions of said two upwardly divergent frame beams carry pins that co-operate with the lower lifting links of the three-point lifting device.

30. An implement as claimed in claim 29, wherein said two frame beams are provided at their lowermost ends with foot plates that support the implement on the ground.

31. An implement as claimed in claim 27, wherein the rear of said frame is a beam of substantially U-shaped configuration, said U-shaped beam having upwardly extending limbs with respective upper ends connected to a hopper.

32. An implement as claimed in claim 31, wherein said U-shaped beam at the rear of the hopper and two upwardly divergent beams at the front of the hopper are interconnected by substantially horizontal side beams.

33. An implement as claimed in claim 27, wherein at least one lateral side of said frame includes a bent supporting wing beam to which a movable portion of said pipe group means is pivotally connected.

34. An implement as claimed in claim 1, wherein one hopper is connected to a larger hopper and conveying means is connected to convey material from the larger hopper into the smaller hopper, the interior of said smaller hopper being substantially hermetically sealed from said larger hopper when the former is filled with material.

35. An implement as claimed in claim 34, wherein the conveying means comprises a cylinder housing an auger.

36. An implement as claimed in claim 35, wherein said cylinder has a length which is not less than the flight pitch of the auger.

37. An implement as claimed in claim 36, wherein said auger extends lengthwise of the bottom of the larger hopper and is arranged progressively to displace material from the larger hopper to the smaller hopper.

38. An implement as claimed in claim 36, wherein the larger hopper is mounted on a mobile wheeled frame having a coupling member that makes a single point connection to a prime mover having a power take-off shaft to which a driving shaft of said implement can be operatively connected.

39. An implement as claimed in claim 38, wherein the distributing pipes of the implement are fastened to the rear of said larger hopper with respect to the normal direction of travel of the mobile frame thereof.

40. An implement as claimed in claim 36, wherein said cylinder extends away from a wall of said larger hopper into the interior of said smaller hopper.

41. An implement as claimed in claim 40, wherein a coupling shaft connects the power take-off shaft of the prime mover, said coupling shaft being positioned to drive the auger and a driving shaft of blower means that forces air through said pipe means, at different speeds, an intermediate shaft being arranged between said coupling shaft and said driving shaft.

42. An implement as claimed in claim 1, wherein an air pipe interconnects said air chamber with the interior of a hopper of said hopper means.

43. An implement as claimed in claim 1, wherein said pipe means includes a plurality of pipes having different lengths, said pipes each having an elongated channel that underlines said flow control device.

44. An implement as claimed in claim 43, wherein said elongated channels have substantially equal cross-sections throughout their lengths.

45. An implement as claimed in claim 43, wherein a hopper of said hopper means has two outlet spouts with corresponding delivery ports and said air chamber is located between said spouts.

46. An implement as claimed in claim 43, wherein said pipes are pivoted to the remainder of said implement and pivotable about a pivot shaft that extends substantially horizontal.

47. An implement as claimed in claim 43, wherein said inlet apertures are located in the upper portions of said pipes.

48. An implement as claimed in claim 43, wherein each inlet spout extends in non-perpendicularly inclined relationship with a corresponding pipe.

49. An implement as claimed in claim 1, wherein at least one of said pipes of said pipe means has an outlet end with a bent-over portion.

50. A spreading implement comprising a hopper for granular and/or pulverant material and lid means substantially hermetically enclosing said hopper, at least one delivery port in said hopper and a flow control device being located below and adjacent said port, said port being in communication with distributor pipe means via a feeding member, said feeding member including inlet aperture means that receives material from with said flow control device and said inlet aperture means being associated with said pipe means, blower means positioned to force a stream of air through said pipe means to entrain material passing through said feeding member into said pipe means, a rectilinearly extending inlet channel part of said pipe means extending adjacent said feeding member to receive material, said inlet aperture means being located directly above and leading into said channel part, said pipe means comprising a plurality of pipes of different lengths and each pipe having a corresponding channel that receives material from said hopper.

51. An implement as claimed in claim 50, wherein the channel part is pivoted to the remainder of said pipe means.

52. An implement as claimed in claim 50, wherein said dosing plate is slideable and a setting mechanism is connected to slide that plate into a plurality of different positions.

53. An implement as claimed in claim 50, wherein said flow control device comprises a substantially horizontal dosing plate with holes.

54. An implement as claimed in claim 50, wherein said inlet aperture means comprises a cover for said channel part.

55. An implement as claimed in claim 54, wherein said cover has at least one spring that biases said flow control device against the edges of said port.

56. An implement as claimed in claim 55, wherein said spring is a leaf spring mounted on said implement.

57. An implement as claimed in claim 54, wherein said cover is detachably connected to said inlet nozzle.

58. An implement as claimed in claim 54, wherein said cover adjoins a sealing rim of a sealing plate located beneath said hopper, said sealing rim being located adjacent a bent-over edge of the sealing plate.

59. An implement as claimed in claim 50, wherein outer movable portions of pipes of said pipe means are connected to the hopper by a suspension member and that member is linked to said portions at a location spaced from a pivotal mounting thereof.

60. An implement as claimed in claim 59, wherein said pipe portions are connected to said implement and turnable relative thereto about an upwardly extending pivotal axis.

61. An implement as claimed in claim 60, wherein said pipe portions are connected to an upwardly extending shaft on a supporting arm, a support member arm being sustained from beneath by said support.

62. An implement as claimed in claim 61, wherein said support member has a bevelled edge positioned to contact said supporting arm during angular displacement about said pivotal axis.

63. An implement as claimed in claim 60, wherein said portions are retained from turning freely about said pivotal axis by a retaining mechanism which is releasable when a pre-determined force is exerted on said portions.

64. An implement as claimed in claim 63, wherein said retaining mechanism has adjusting means to vary the force needed to release same.

65. An implement as claimed in claim 64, wherein said retaining mechanism comprises a spring-loaded lock bolt having a notch that co-operates with a pin element on said supporting arm.

66. An implement as claimed in claim 65, wherein said lock bolt is pivotably mounted and is provided with an adjustable pin that extends through an opening in said support, said adjustable pin being surrounded between the side of said support remote from said lock bolt and stop nut threaded on the adjustable pin, by a loading spring.

67. An implement as claimed in claim 60, wherein said pivotal axis is located to the rear of said pipes with respect to the normal direction of travel.

68. An implement as claimed in claim 50, wherein said hopper is mounted on a frame and pipes of said pipe means are connected by at least one support to said frame, whereby the pipes can be sustained directly from the ground surface during travel of the implement.

69. A spreading implement comprising a substantially hermetically enclosed hopper for material to be spread and an air chamber with blower means being in communication with said hopper, delivery ports adjacent the bottom of said hopper and a group of distributor pipes extending laterally from said hopper, elongated channels with inlet apertures being connected to said group of pipes below each port, a flow-control device with a hole for each aperture being positioned below said delivery port and said device being settable to control material flow through said delivery port, said channels having inner ends that open into said air chamber and said blower means being operative to force a stream of air from said chamber into said channels to entrain material passing by gravity through said flow-control device and expel the material out of said group of pipes.

70. An implement as claimed in claim 69, wherein said air chamber is located adjacent said hopper and between said delivery ports.

71. An implement as claimed in claim 70, wherein said channels are pivoted to a wall of said air chamber and turnable about a substantially horizontal shaft to separate the nozzles from a corresponding port.

72. An implement as claimed in claim 69, wherein said group of pipes is pivoted to corresponding channels and movable about a substantially horizontal pivot axis to an upwardly extending position for transport.

73. An implement as claimed in claim 72, wherein said group of pipes is also pivoted to said channels and turnable about a substantially vertical axis.

74. An implement as claimed in claim 72, wherein a flexible connection comprising an apertured block of foam rubber or synthetic plastic foam is located at the junctions between channels and inner ends of the pipes.

75. An implement as claimed in claim 74, wherein said block completely surrounds the inner ends of said pipes.

76. A spreading implement comprising a frame with a hopper for material to be spread and lid means substantially hermetically enclosing said hopper, said hopper having two spaced apart outlet spouts and a delivery port in said hopper for each spout, a flow control device being located below each spout and adjacent said ports, said ports being positioned one behind the other and said spouts being positioned across from one another with respect to the normal direction of travel, an air chamber with blower means being located between said spouts and pipe means having open inner ends connected to said air chamber at each side thereof to receive forced air, said pipe means comprising a group of pipes having different lengths that are connected to said inner ends and the latter being pivoted to the implement and turnable as a unit about a substantially horizontal axis that extends in the normal direction of travel, said inner ends having inlets with feeding means that are positioned below said ports, said inner ends, group of pipes and feeding means being movable together in a vertical direction away from said ports and said flow control device.

77. An implement as claimed in claim 76, wherein each group of pipes extends laterally from said hopper during operation and is supported by arm means on said frame.

78. An implement as claimed in claim 77, wherein said group of pipes is pivoted on an upwardly extending shaft on said arm means and turnable with respect to said inner ends.

79. An implement as claimed in claim 78, wherein said group of pipes is connected to said inner ends by resilient sealing means.

80. An implement as claimed in claim 79, wherein said group of pipes is supported on said arm means with a pivoted bracket.

81. An implement as claimed in claim 76, wherein said hopper has two outlet spouts and each spout has a corresponding port and flow control member, each flow control member being connected to a common setting mechanism and movable to any one chosen setting, said setting mechanism being connected for simultaneous and substantially equal alteration to the settings of each flow control member.

82. An implement as claimed in claim 81, wherein each flow control member can be optionally uncoupled from arm means of said setting mechanism independently of each other flow control member.

83. An implement as claimed in claim 82, wherein said setting mechanism comprises a control arm located at the forward side of the implement with respect to the normal direction of travel thereof, said control arm being coupled by a connecting arm to a pin movable along a slot formed in a supporting strip, said pin also being coupled to strip means connectable to rod and pivot systems operatively to move associated corresponding flow control members.

84. An implement as claimed in claim 83, wherein a first strip is fixedly secured to a shaft of each corresponding rod and pivot system and a second strip is turnable about the axis of that shaft, a removable locking pin securing said first and second strips to one another and to said control arm to operate that rod and pivot system.

85. An implement as claimed in claim 81, wherein said hopper has two outlet spouts at the bottom thereof and an enclosed air chamber between said spouts, air ducts extending between said means for forcing air through said pipes and said air chamber comprising a flow control vane by which the volume of air fed to said air chamber per unit time can be varied.

86. An implement as claimed in claim 85, wherein said air flow control vane is coupled to a setting mechanism for said flow control member, that operation of said mechanism being connected to produce simultaneous adjustments of said air flow control vane and each flow control member.

87. An implement as claimed in claim 86, wherein said air flow control vane is connected to the setting mechanism for throttling the flow of air when said flow control member is moved by said mechanism to reduce the flow of material to said pipes.

* * * * *